United States Patent
Parruck et al.

[11] Patent Number: 5,257,261
[45] Date of Patent: Oct. 26, 1993

[54] METHODS AND APPARATUS FOR CONCATENATING A PLURALITY OF LOWER LEVEL SONET SIGNALS INTO HIGHER LEVEL SONET SIGNALS

[75] Inventors: Bidyut Parruck, Stratford; Robert W. Hamlin, Jr., Huntington, both of Conn.

[73] Assignee: TranSwitch Corporation, Shelton, Conn.

[21] Appl. No.: 877,653

[22] Filed: May 1, 1992

Related U.S. Application Data

[63] Continuation-in-part of Ser. No. 559,636, Jul. 27, 1990, Pat. No. 5,142,529, which is a continuation-in-part of Ser. No. 848,384, Mar. 9, 1992.

[51] Int. Cl.$^5$ .............................................. H04J 14/08
[52] U.S. Cl. ........................................ 370/84; 370/112; 359/115
[58] Field of Search ................ 370/84, 110.1, 112; 359/115, 118, 135

[56] References Cited

U.S. PATENT DOCUMENTS

| | | | |
|---|---|---|---|
| 4,967,405 | 10/1990 | Upp et al. | 359/135 |
| 5,040,170 | 8/1991 | Upp et al. | 370/99 X |
| 5,065,396 | 11/1991 | Castellano et al. | 370/84 |
| 5,134,614 | 7/1992 | Baydar et al. | 370/110.1 X |
| 5,142,529 | 8/1992 | Parruck et al. | 370/84 |

*Primary Examiner*—Douglas W. Olms
*Assistant Examiner*—Melvin Marcelo
*Attorney, Agent, or Firm*—David P. Gordon

[57] ABSTRACT

Apparatus and methods for concatenating a plurality of lower level SONET signals into higher level SONET signals are provided. In generating a higher level SONET signal (e.g., STS-12C) using a plurality of lower level SONET signal processing apparatus (e.g., STS-3 type terminators), the J1 bytes of each lower level signal are tracked through the FIFOs of the apparatus to provide J1 byte control signals, and a logic circuit is provided having phase 3 of the outgoing STS-3 clock, and the J1 byte control signals from all the STS channels of the higher level signal as inputs. The J1 byte control signals from all the channels are combined as a J1ANDcomposite by utilizing a single bus which is coupled to each of the apparatus. The logic circuit inhibits a read of a J1 byte from any particular FIFO unless the J1ANDcomposite signal is high at phase 3 of the clock. In addition to the J1 byte circuitry, the lower level SONET signal processing apparatus are coupled to adjacent apparatus so that the B3 parity byte value from one apparatus is passed to the next apparatus for inclusion in its calculation of the B3 parity byte. Eventually, the master apparatus calculates a B3 parity byte for the STS-Nc signal. The master apparatus also provides the slave apparatus with transmit and receive SPE signals, and a receive J1 signal.

9 Claims, 12 Drawing Sheets

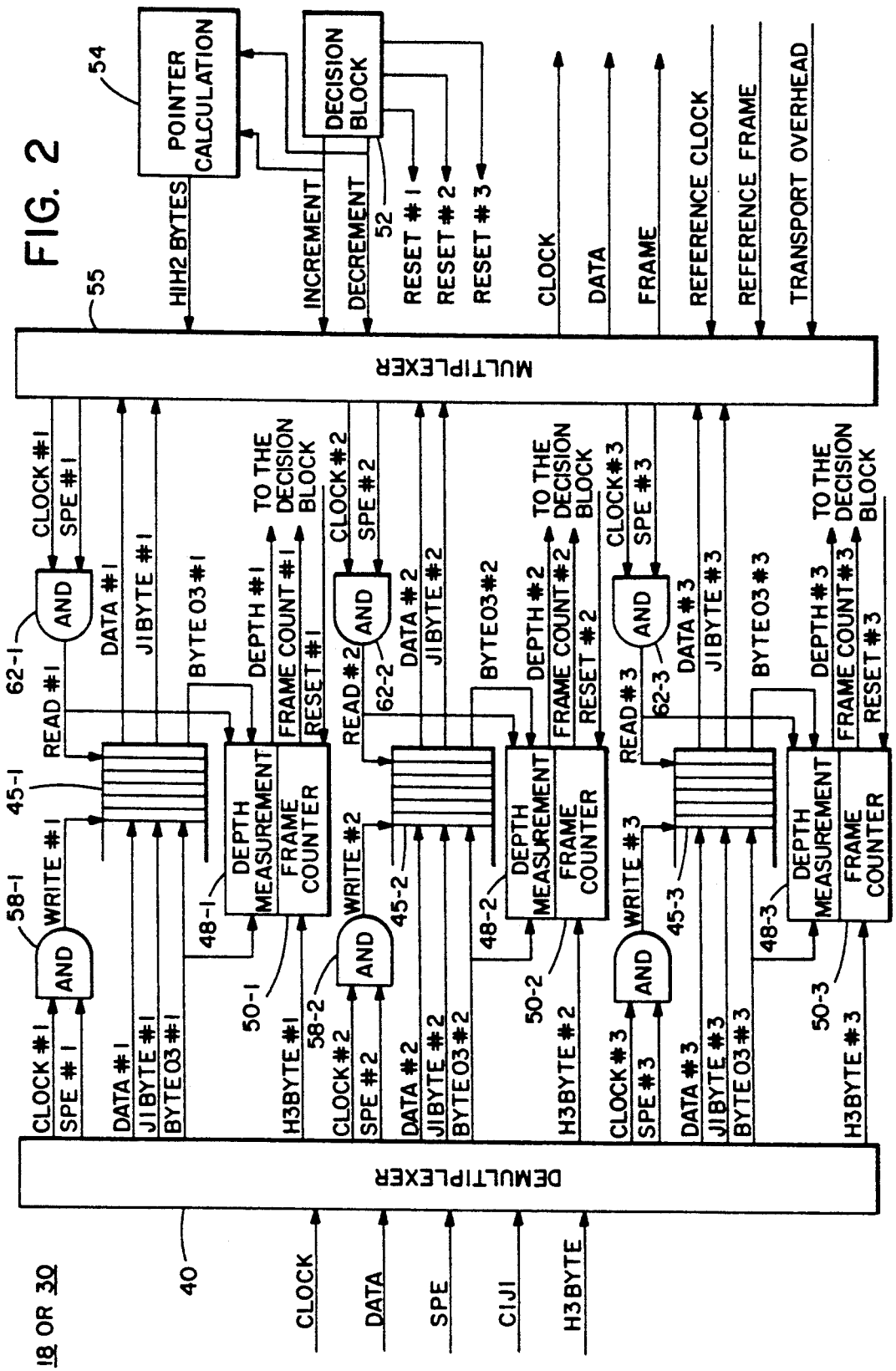

FIG. 4a

| FIFO DEPTH #1 | FIFO DEPTH #2 | FIFO DEPTH #3 | FRAME COUNT | ACTION |
|---|---|---|---|---|
| + SOFT THRESHOLD | + SOFT THRESHOLD | + SOFT THRESHOLD | >LONG | DECREMENT |
| − SOFT THRESHOLD | − SOFT THRESHOLD | − SOFT THRESHOLD | >LONG | INCREMENT |
| + HARD THRESHOLD | + HARD THRESHOLD | + HARD THRESHOLD | >SHORT | DECREMENT |
| + HARD THRESHOLD | + SOFT THRESHOLD | + SOFT THRESHOLD | >SHORT | DECREMENT |
| + HARD THRESHOLD | + HARD THRESHOLD | + SOFT THRESHOLD | >SHORT | DECREMENT |
| + SOFT THRESHOLD | + HARD THRESHOLD | + SOFT THRESHOLD | >SHORT | DECREMENT |
| + SOFT THRESHOLD | + SOFT THRESHOLD | + HARD THRESHOLD | >SHORT | DECREMENT |
| + SOFT THRESHOLD | + HARD THRESHOLD | + HARD THRESHOLD | >SHORT | DECREMENT |
| − HARD THRESHOLD | − HARD THRESHOLD | − HARD THRESHOLD | >SHORT | INCREMENT |
| − HARD THRESHOLD | − SOFT THRESHOLD | − SOFT THRESHOLD | >SHORT | INCREMENT |
| − HARD THRESHOLD | − HARD THRESHOLD | − SOFT THRESHOLD | >SHORT | INCREMENT |
| − SOFT THRESHOLD | − HARD THRESHOLD | − SOFT THRESHOLD | >SHORT | INCREMENT |
| − SOFT THRESHOLD | − SOFT THRESHOLD | − HARD THRESHOLD | >SHORT | INCREMENT |
| − SOFT THRESHOLD | − HARD THRESHOLD | − HARD THRESHOLD | >SHORT | INCREMENT |
| SOFT THRESHOLD | NORMAL | NORMAL | ANY VALUE | NONE |
| SOFT THRESHOLD | NORMAL | SOFT THRESHOLD | ANY VALUE | NONE |
| NORMAL | NORMAL | SOFT THRESHOLD | ANY VALUE | NONE |
| NORMAL | SOFT THRESHOLD | NORMAL | ANY VALUE | NONE |
| NORMAL | SOFT THRESHOLD | SOFT THRESHOLD | ANY VALUE | NONE |
| NORMAL | NORMAL | NORMAL | ANY VALUE | NONE |
| SOFT THRESHOLD | SOFT THRESHOLD | NORMAL | ANY VALUE | NONE |
| SOFT THRESHOLD | SOFT THRESHOLD | NORMAL, SOFT THRESHOLD | ANY VALUE | NONE |
| + SOFT THRESHOLD | − SOFT THRESHOLD | NORMAL, SOFT THRESHOLD | ANY VALUE | NONE |
| − SOFT THRESHOLD | + SOFT THRESHOLD | NORMAL, SOFT THRESHOLD | ANY VALUE | NONE |

FIG. 4b

| FIFO DEPTH #1 | FIFO DEPTH #2 | FIFO DEPTH #3 | FRAME COUNT | ACTION |
|---|---|---|---|---|
| NORMAL, SOFT THRESHOLD | +SOFT THRESHOLD | -SOFT THRESHOLD | ANY VALUE | NONE |
| NORMAL, SOFT THRESHOLD | -SOFT THRESHOLD | +SOFT THRESHOLD | ANY VALUE | NONE |
| +SOFT THRESHOLD | NORMAL, SOFT THRESHOLD | -SOFT THRESHOLD | ANY VALUE | NONE |
| -SOFT THRESHOLD | NORMAL, SOFT THRESHOLD | +SOFT THRESHOLD | ANY VALUE | NONE |
| +HARD THRESHOLD | +HARD THRESHOLD, NORMAL | +HARD THRESHOLD, NORMAL | >SHORT | DECREMENT |
| +HARD THRESHOLD, NORMAL | +HARD THRESHOLD | +HARD THRESHOLD, NORMAL | >SHORT | DECREMENT |
| +HARD THRESHOLD, NORMAL | +HARD THRESHOLD, NORMAL | +HARD THRESHOLD | >SHORT | DECREMENT |
| -HARD THRESHOLD | -HARD THRESHOLD, NORMAL | -HARD THRESHOLD, NORMAL | >SHORT | INCREMENT |
| -HARD THRESHOLD, NORMAL | -HARD THRESHOLD | -HARD THRESHOLD, NORMAL | >SHORT | INCREMENT |
| -HARD THRESHOLD, NORMAL | -HARD THRESHOLD, NORMAL | -HARD THRESHOLD | >SHORT | INCREMENT |
| +HARD THRESHOLD | <--SOFT THRESHOLD | ANY VALUE | ANY VALUE | ERROR |
| +HARD THRESHOLD | ANY VALUE | <--SOFT THRESHOLD | ANY VALUE | ERROR |
| -HARD THRESHOLD | >+SOFT THRESHOLD | ANY VALUE | ANY VALUE | ERROR |
| -HARD THRESHOLD | ANY VALUE | >+SOFT THRESHOLD | ANY VALUE | ERROR |
| ANY VALUE | +HARD THRESHOLD | ANY VALUE | ANY VALUE | ERROR |
| ANY VALUE | +HARD THRESHOLD | ANY VALUE | ANY VALUE | ERROR |
| ANY VALUE | -HARD THRESHOLD | ANY VALUE | ANY VALUE | ERROR |
| ANY VALUE | -HARD THRESHOLD | ANY VALUE | ANY VALUE | ERROR |
| ANY VALUE | ANY VALUE | +HARD THRESHOLD | ANY VALUE | ERROR |
| ANY VALUE | ANY VALUE | +HARD THRESHOLD | ANY VALUE | ERROR |
| ANY VALUE | ANY VALUE | -HARD THRESHOLD | ANY VALUE | ERROR |
| ANY VALUE | ANY VALUE | -HARD THRESHOLD | ANY VALUE | ERROR |
| NORMAL | NORMAL | NORMAL | ANY VALUE | NONE |
| ANY VALUE | ANY VALUE | ANY VALUE | <SHORT | NONE |

FIG. 6a
PRIOR ART
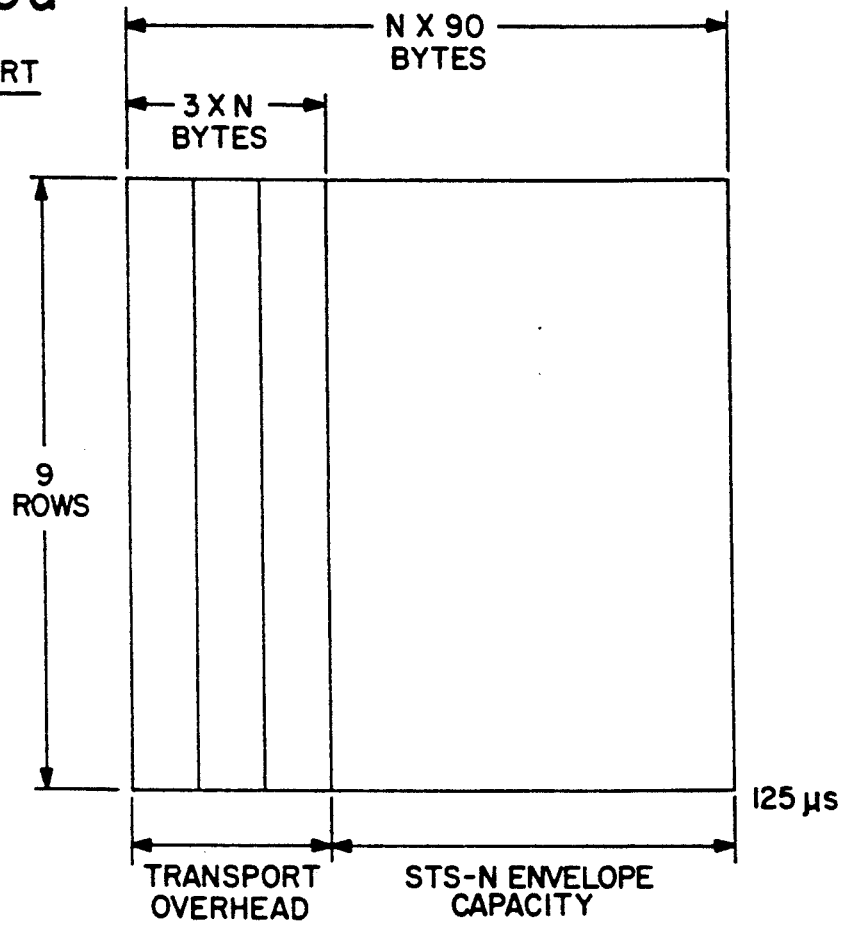
FIG. 6c
PRIOR ART
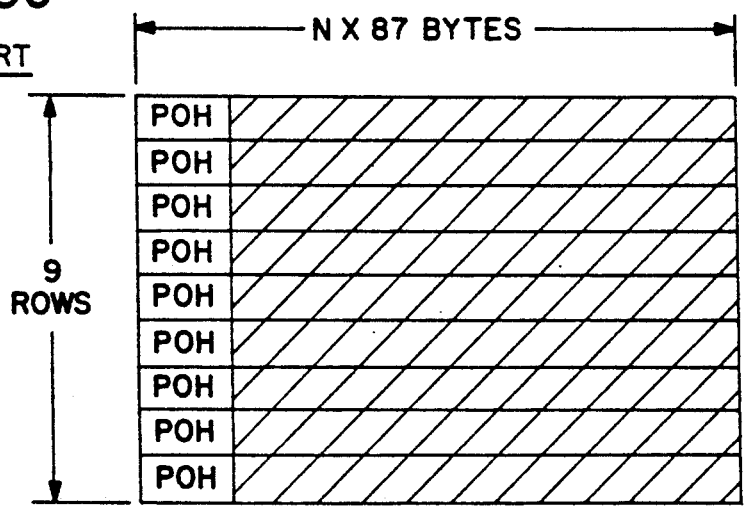
POH : PATH OVERHEAD BYTE
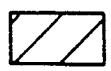 : STS-Nc PAYLOAD CAPACITY

□ : UNDEFINED OVERHEAD BYTE (ALL-ZEROS PATTERN AS AN OBJECTIVE)

* : CONCATENATION INDICATION
  H1*(10010011)
  H2*(11111111)

METHODS AND APPARATUS FOR CONCATENATING A PLURALITY OF LOWER LEVEL SONET SIGNALS INTO HIGHER LEVEL SONET SIGNALS

This is a continuation-in-part of Ser. No. 07/559,636 filed Jul. 27, 1990 U.S. Pat. No. 5,142,529 and Ser. No. 07/848,384 filed on Mar. 9, 1992, pending which are both hereby incorporated by reference herein in their entireties.

BACKGROUND OF THE INVENTION

This invention generally relates to the optical telecommunications network. More particularly, this invention relates to the support in apparatus which process lower level SONET signals for the concatenation of those lower level SONET signals into higher level SONET signals.

The telecommunications network servicing the Unites States and the rest of the world is presently evolving from analog transmission to digital transmission with ever-increasing bandwidth requirements. Fiber optic cable has proved to be a valuable tool of such evolution, replacing copper cable in nearly ever application from large trunks to subscriber distribution plants. Fiber optic cable is capable of carrying much more information than copper with lower attenuation.

While fiber optic cable represents the future in telecommunications, presently there remains an entire telecommunications network comprised of various cable types, served by equipment of different vintages, and run according to various coexisting transmission standards. While older standards, cables, and equipment will be eventually phased out, for the time being it is necessary that all the old and new standards, equipment and transmission lines be as compatible as possible. In fact, even where relatively new optical network equipment is in place, such as cross-connection (switch) equipment capable of handling SONET signals such as STS-1 signals, even higher level signals (such as STS-3 and STS-3C, details of which are seen in prior art FIGS. 6a–6d) are being generated. Typically, cross-connection equipment for such high level signals is unavailable or not commonly in place. Thus, in order for higher level signals to be utilized, mechanisms for accommodating the higher level signals to the lower level equipment are necessary; i.e., backwards compatability is required. In addition, even as apparatus for handling SONET signals such as STS-1 and STS-3 are being proposed, forward compatability is desirable, such that the same apparatus can be used to process even higher level SONET signals such as STS-12, etc.

SUMMARY OF THE INVENTION

It is therefore an object of the invention to provide mechanisms for the concatenation of separate apparatus to effect the recombination of higher level telecommunication signals after they have been broken into a plurality of constituent components for cross-connection by lower level cross-connection equipment and/or for transmission over the switched network.

It is another object of the invention to provide methods and apparatus for concatenating separate chips handling STS-3C signals to effect the handling of an STS-12C signal.

In accord with the objects of the invention, the concatenation of a plurality of SONET signal handling apparatus (silicon chips) is obtained by: taking the logical AND of a POH synchronous byte control signal exiting each chip and providing the logical AND as a control to inhibit or permit the reading of a J1 byte from the data streams of each chip, providing a transmit SPE signal from the master chip to the slave chips to further control the reading of a J1 byte from the data streams of each chip; and forwarding the BIP-8 parity byte (B3) of each chip to another chip, and using the parity bytes of other chips in determining the parity byte for the master chip. The logical OR of the POH synchronous byte control signal exiting each chip is also taken for purposes of stuff and destuff decisions. Preferably, the POH synchronous byte control signal relates to the J1 bytes of the SONET signal. Where the silicon chips process STS-1 signals, the POH synchronous byte control signal is preferably the J1 byte of the STS-1 signal. Where the silicon chips process STS-3 signals, the POH synchronous byte control signal is preferably the logical AND of the three J1 bytes of the STS-1 components of the STS-3 signal processed by the STS-3 processing chip.

In accord with preferred aspects of the invention, the logical AND of the synchronous byte control signal exiting each chip is taken by coupling all of the exiting synchronous byte control signals via tri-state drivers to a common bus. The bus is coupled via a pull-up resistor to a high voltage source ($V_{DD}$). The voltage on the bus is driven low when any exiting signal is low. However, when the exiting signals are high, the bus voltage is pulled to a high voltage level by the pull-up resistor. Similarly, the logical OR of the synchronous byte control signal exiting each chip is taken by coupling the exiting control signals via tri-state drivers to a second bus which is coupled via a pull-down resistor to a low voltage source (GND). Whenever any exiting signal is high, the voltage on the bus is driven high. However, when all of the exiting signals are low, the bus voltage is pulled to a low voltage level by the pull-down resistor.

Additional objects and advantages of the invention will become apparent to those skilled in the art upon reference to the detailed description taken in conjunction with the provided figures.

BRIEF DESCRIPTION OF THE DRAWINGS

FIGS. 4a and 4b together comprise a chart of the decision mechanism for the retiming apparatus of FIG. 2 for STS-3C signals;

FIGS. 5a-2 and 5a-3 are circuit diagrams for providing the J1ANDcomposite and J1ORcomposite signals to the realignment apparatus of FIG. 5a-1;

FIGS. 6a, 6b, and 6c are prior art diagrams showing the formats of an STS-N frame, an STS-3 type transport overhead, and an STS-NC SPE.

DETAILED DESCRIPTION OF THE PREFERRED EMBODIMENTS

The invention is hereinafter described with reference to the concatenation of four STS-3 type handling (terminating) apparatus in order to handle a STS-12c type signal. It should be appreciated, however, that the invention equally applies to the concatenation of any number of STSn type handling apparatus, regardless of whether the handling apparatus are STS-1, STS-3 or other types, and regardless of how many handling apparatus are being concatenated.

Figure 1A:
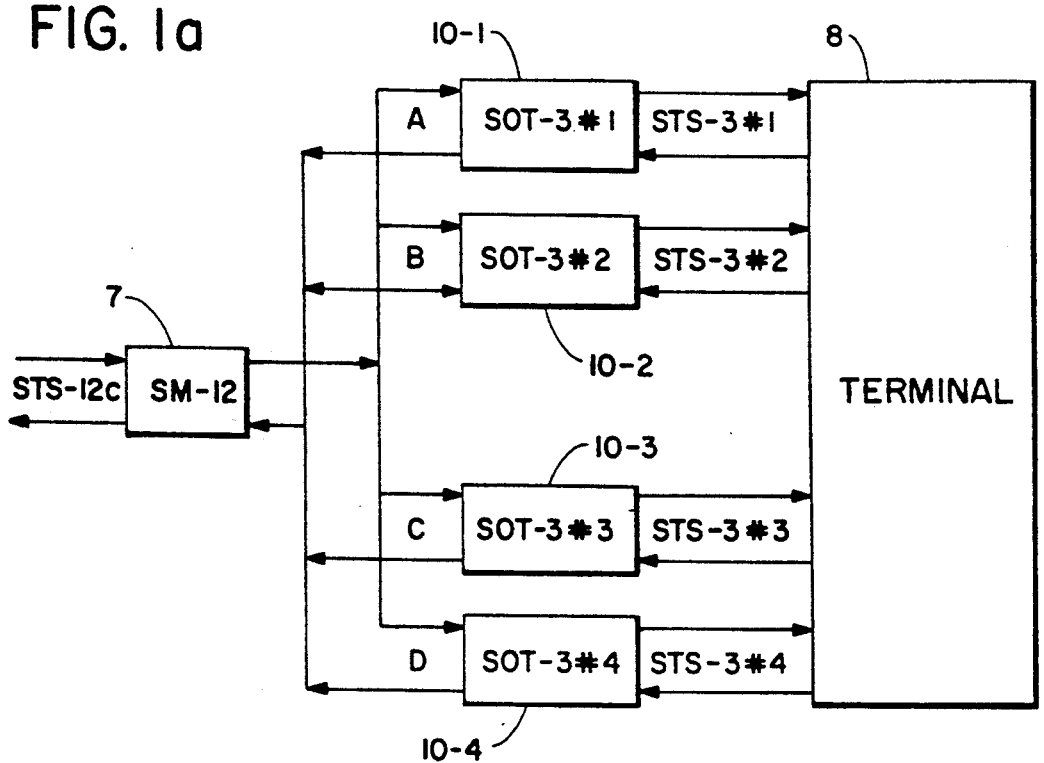
FIG. 1a is a block diagram of a plurality of STS-3 handling apparatus in conjunction with an STS-12 multiplexer/demultiplexer and a terminal.

A typical application for high speed data communication signals is seen with reference to FIG. 1a where an STS-12c type signal is being received and demultiplexed by a multiplexer/demultiplexer 7 which also functions to multiplex four transmitted STS-3 signals. The received STS-12c type signal is demultiplexed into four STS-3 type signals by the multiplexer/demultiplexer 7 and forward to four STS-3 type handling apparatus 10 (10-1, 10-2, 10-3, 10-4) which are described in more detail hereinafter. After handling, the STS-3 type handling apparatus 10 forward the STS-3 type signals to a terminal 8 which can cross-connect the STS-3 type signals or otherwise terminate them. On the transmitting side, the terminal 8 is seen sending four STS-3 type signals to the STS-3 type handling apparatus 10. The STS-3 type handling apparatus 10 process the signals and forward them to the multiplexer/demultiplexer 7 for output as an STS-12c signal.

Figure 1B:
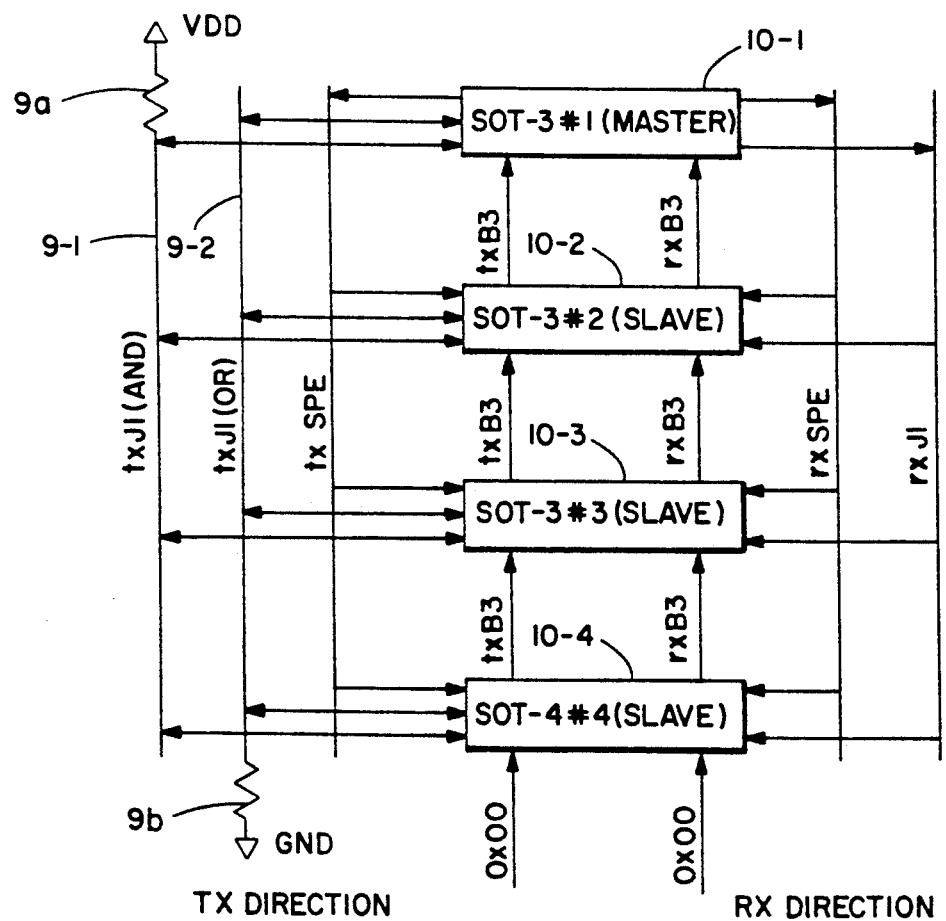
FIG. 1b is a signal flow diagram showing the concatenation signals required for permitting the STS-3 handling apparatus to effect the processing and concatenation of separate STS-3 type signals into an STS-12 type signal.

As shown in FIG. 1b, in order for the STS-3 type handling apparatus 10 to properly handle the incoming signals and provide them for transmission as an STS-12 type signal, the STS-3 handling apparatus 10 are connected. Thus, on both the transmit and receive side, one (the first) of the handling apparatus (10-1) is designated as the master, and the other handling apparatus (10-2, 10-3, and 10-4) as the slaves. The master handling apparatus 10-1 dictates when an incoming SPE and when an incoming J1 byte are being received and when an outgoing SPE is to be sent by generating rxSPE, rxJ1, and txSPE control signals and sending them to the slave handling apparatus. Other connections between the handling apparatus 10 include busses 9-1, 9-2 which help generate the transmit J1ANDcomposite and J1ORcomposite signals as described in more detail hereinafter. As shown in FIG. 1b, each of the handling apparatus are connected to busses 9-1 and 9-2. Also, as seen in FIG. 1b, each handling apparatus is preferably connected to its adjacent handling apparatus (10-4 being connected to 10-3; 10-3 being connected to 10-2 and 10-4; 10-2 being connected to 10-1 and 10-3; and 10-1 being connected to 10-2) for the purpose of calculating a B3 parity signal for the STS-12c signal. If desired, apparatus 10-1 may be connected to apparatus 10-4 for the purpose of B3 parity byte calculation as discussed hereinafter.

Figure 1C:
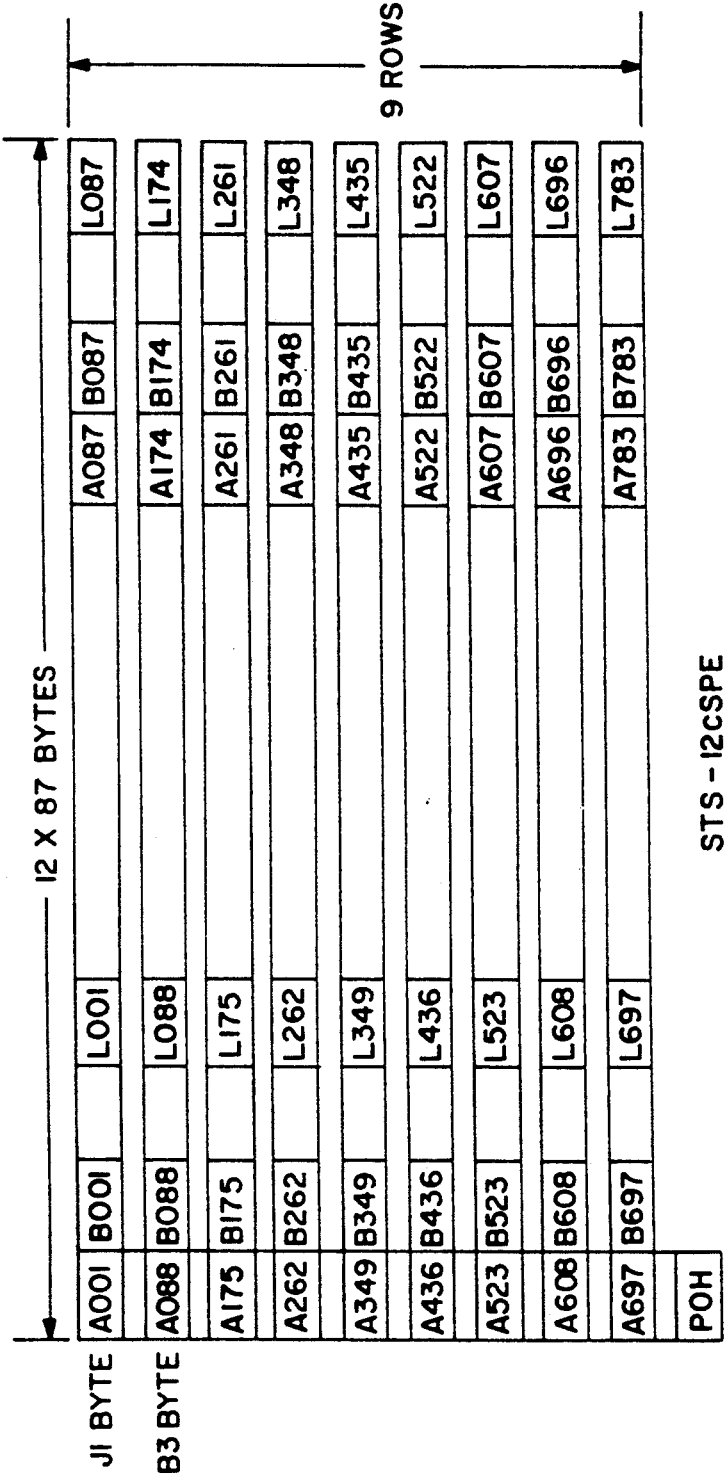
FIG. 1c is a diagram representing the B3 calculation for STS-12c signals using four STS-3 type handling apparatus.

The calculation of the B3 parity signal is best understood with reference to FIG. 1c. In particular, in FIG. 1c an STS-12c SPE is represented as having 12×87 bytes (see also prior art FIG. 6c). The parity byte B3 for the STS-12c signal is obtained by taking the logical XOR of all of the bytes in the STS-12c SPE; i.e., B3 = (A001) XOR (B001) XOR (C001) XOR (D001) XOR ... XOR (L001) XOR (A002) XOR (B002) XOR ... XOR (K783) XOR (L783). As seen with reference to FIG. 1b, the parity byte B3 for each STS-3 component of the STS-3 signal is preferably calculated in each STS-3 terminating apparatus, and the output of each terminating apparatus is forwarded to the terminating apparatus adjacent thereto. Thus, terminating apparatus 10-4 calculates a B3 parity byte according to:

$$B3\#4 = (0x00)XOR(J001)XOR(K001)X-$$
$$OR(L001)XOR(J002)XOR(L002)XOR...$$
$$XOR(J783)XOR(K783)XOR(L783)$$

It is noted that the (0x00) input is because each STS-3 terminating apparatus is preferably identical and therefore looks for a B3 signal from an adjacently lower apparatus. As the terminating apparatus 10-4 is the "lowest" apparatus in the concatenation chain, there is no adjacent apparatus for a B3 signal input.

The terminating apparatus 10-3 calculates a B3 parity byte according to:

$$B3\#3 = (B3\#4)XOR(G001)XOR(H001)XOR(I001)X-$$
$$OR(G002)XOR...$$
$$XOR(G783)XOR(H783)XOR(I783)$$

In the B3 parity byte calculation, the output of the terminating apparatus 10-4 is taken into account. Thus, effectively, the B3 parity byte calculation conducted by terminating apparatus 10-3 determines a parity byte for six (G, H, I, J, K, L) STS-1 channels.

The terminating apparatus 10-2 likewise calculates the B3 parity byte according to:

$$B3\#2 = (B3\#3)XOR(D001)XOR(E001)XOR(F001)X-$$
$$OR(D002)XOR...$$
$$XOR(D783)XOR(E783)XOR(F783)$$

Finally, the terminating apparatus 10-1 calculates the B3 parity byte for the entire STS-12c signal according to:

$$B3\#1 = B3 = (B3\#2)XOR(A001)XOR(B001)X-$$
$$OR(C001)XOR(A002)XOR...$$
$$XOR(A783)XOR(B783)XOR(C783).$$

Preferably, the timing of the B3 parity byte calculations is set such that sometime after the corresponding (transmit or receive) J1 byte and preferably several bytes before the B3 byte (depending upon the number of concatenated chips), the lowest terminating apparatus (e.g., 10-4) calculates and transmits its B3 parity calculation to its adjacent terminating apparatus (e.g., 10-3). By the next byte time, the chip receiving the lowest level B3 parity calculation, conducts its own B3 parity calculation as described above, and at the next byte time transmits its B3 parity calculation to the adjacent higher terminating apparatus. This process continues until the master receives the B3 parity calculation from its adjacent slave apparatus in time to calculate the B3 parity value for the STS-NC signal for use.

Alternatively, the timing of the B3 parity byte calculations may be accomplished sometime after the J1 byte and before the B3 byte by having the lowest terminating apparatus calculate its B3 parity value, and then send a control signal which cannot be confused with a parity value (e.g., 1111111111111111) followed by the B3 parity value to the adjacent terminating apparatus. If desired, the master terminating apparatus can tell the lowest terminating apparatus when to start its B3 parity byte value calculation by sending the control signal followed by all zeroes to the lowest slave. Regardless, the adjacent terminating apparatus awaits receipt of the control signal and the B3 parity value before calculating its parity value and sending the same control signal and B3 calculation to the next higher apparatus. This process continues until the master (e.g., 10-1) receives the control signal and the B3 parity value from the first slave apparatus (e.g. 10-2). In this manner, the entire operation can be completed without each apparatus knowing where it is in the chain. It should also be appreciated that any of these techniques can be used in calculating both the transmit and receive B3 parity values.

Figure 1D:
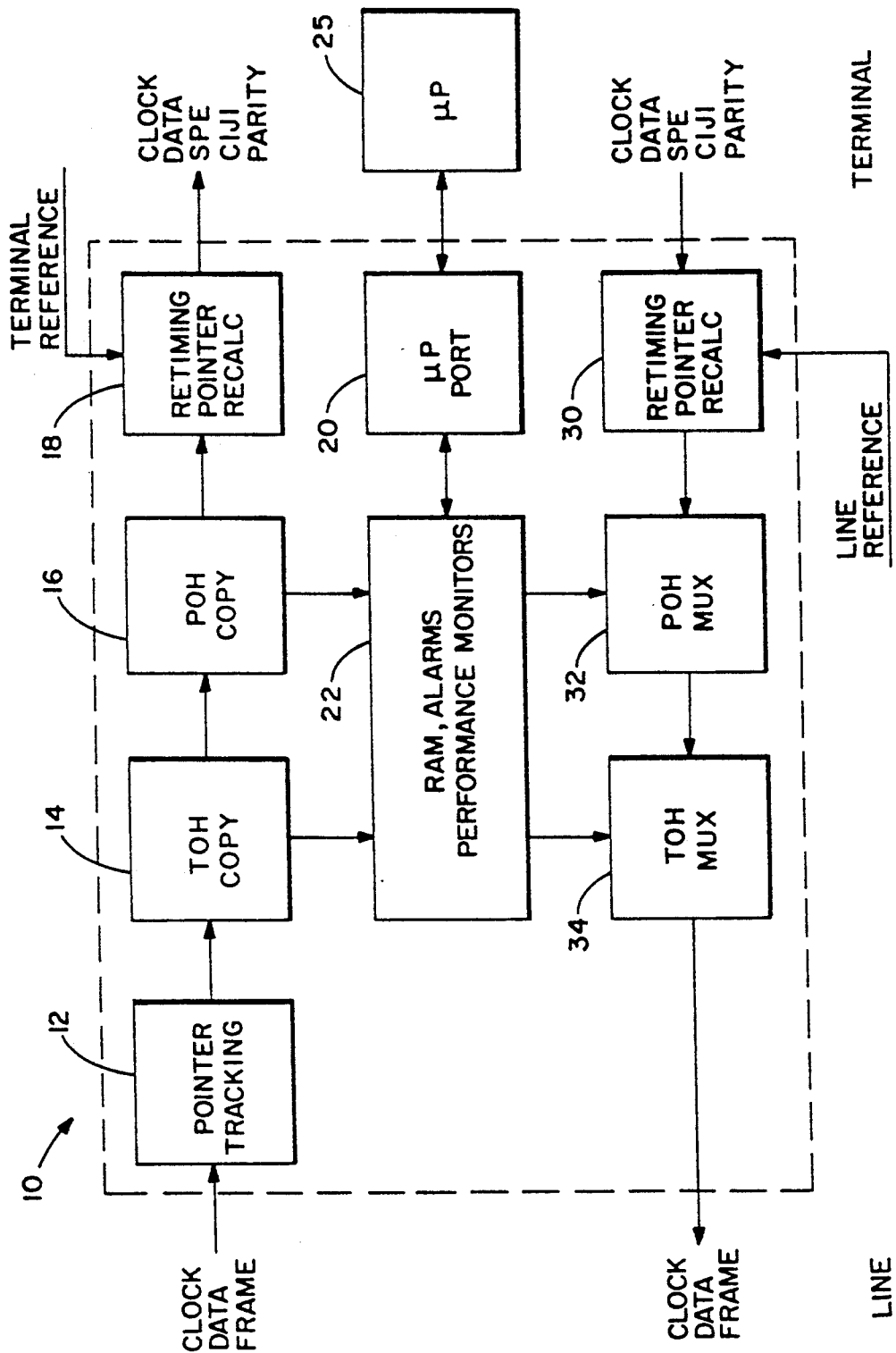
FIG. 1d is a block diagram of a preferred STS-3 type handling apparatus shown in FIGS. 1a and 1b in which retiming and realignment apparatus are found.

The preferred STS-3 type terminator apparatus 10 of the invention is seen in FIG. 1d. The terminator apparatus 10 includes receive circuitry as well as transmit circuitry, and both the receive and transmit circuitry can be used, if desired, in conjunction with cross-connection equipment. The terminator apparatus 10 shown finds particular use in conjunction with cross-connection equipment capable of cross-connecting STS-1 type signals, although it can also be used in conjunction with a terminal or add/drop circuit. It will be appreciated by those skilled in the art that the receive and transmit circuitry of the terminator apparatus 10 of the invention need not be located on the same physical apparatus.

As seen in FIG. 1d, on the receive side, where the terminator apparatus 10 receives a clock signal, a data signal, and a frame signal, pointer tracking circuitry 12 as is known in the art is used to find the pointers H12 for each of the STS-1 payloads in the received STS-3 signal. Where the incoming data signal is an STS-3C signal, only one H1H2 pointer is found, as the other H1 bytes are provided with a concatenation indication (10010011), and the other H2 bytes are provided with a concatenation indication (11111111)—as may be seen with reference to prior art FIG. 6b.

In accord with the preferred embodiment of the invention, in the terminator apparatus 10, once the H1H2 pointer(s) is located, the transmit overhead (TOH) and path overhead (POH) are both easily located. The TOH is copied at TOH copy circuitry 14, and the TOH bytes are sent to the data RAM 22, from which they may be read by an external microprocessor 25. Similarly, the POH copying circuit 16 copies the POH bytes and sends them to data RAM 22 for monitoring purposes. Thus, as shown in FIG. 1d, alarm and performance monitors are provided in conjunction with the RAM 22. The monitors, among other things, preferably perform the receive B1, B2, and B3 parity calculations (B3 being calculated as discussed above), pointer justification monitoring, and alarm calculation. Sixteen bit counters (not shown) are preferably used to record parity errors, while eight bit counter (not shown) monitor the number of new data flags and pointer justifications. The counter values and alarm status bits are supplied to the microprocessor port or interface 20.

Returning to the discussion of the incoming STS-3 type signal, after the TOH and POH have been copied and sent to RAM 22, the STS-3 type signal is then sent to the retiming and pointer calculation block 18. Also sent to the retiming and pointer calculation block 18 is a SPE control signal which is high when the block 18 is receiving the SPE, a C1J1 control signal which is high when the C1 and the J1 bytes are being received by the block 18, and the incoming clock signal. As will be described in more detail hereinafter with reference to FIG. 2, the retiming and pointer recalculation block takes the incoming signal at the incoming STS-3 rate, demultiplexes the signal into three STS-1 type components, calculates new pointers (e.g., H1H2) for each STS-1 type signal, stuffs and destuffs the STS-1 signals as appropriate (in bytes H3 as seen in FIG. 6b and the first byte after the H3 byte—hereinafter referred to as byte0), and multiplexes the three STS-1 signals back into a retimed STS-3 type signal for output at the terminal side clock rate. In a typical application, the retimed STS-3 type signal are then demultiplexed again into STS-1 signals, and cross-connected using STS-1 type cross-connects. The cross-connected signals are then remultiplexed and fed to the "output side" of the same or other terminator blocks 10, details of which will be discussed below. In another application, rather than demultiplexing the STS-3 signals into STS-1 signals which are cross-connected, the STS-3 signal can be terminated; i.e., sent to a terminal. Also, instead of multiplexing the STS-1 signals into an STS-3 signal which is then demultiplexed and cross-connected, the individual STS-1 signals can be terminated. Of course, this also applies to terminating STS-12C type signals.

On the output side of the terminator block 10, an STS-3 type signal is received which is comprised of three STS-1 signals which typically have been cross-connected and multiplexed together. Because the STS-3 signals coming back from the cross-connect are at a data rate which may be different then the outgoing STS-3 line rate, the signals are demultiplexed, retimed again, and multiplexed again at retiming and pointer calculation block 30 (which is typically identical to block 18). However, in reconstituting the STS-3 signal, the path overhead (except for H4) and transport overhead bytes are multiplexed into the signal at POH mux 32 and TOH mux 34 respectively. The information for these overhead bytes is preferably taken from RAM 22 which receives its information from the alarm and performance monitors and the microprocessor 25.

Figures 1, 5A:
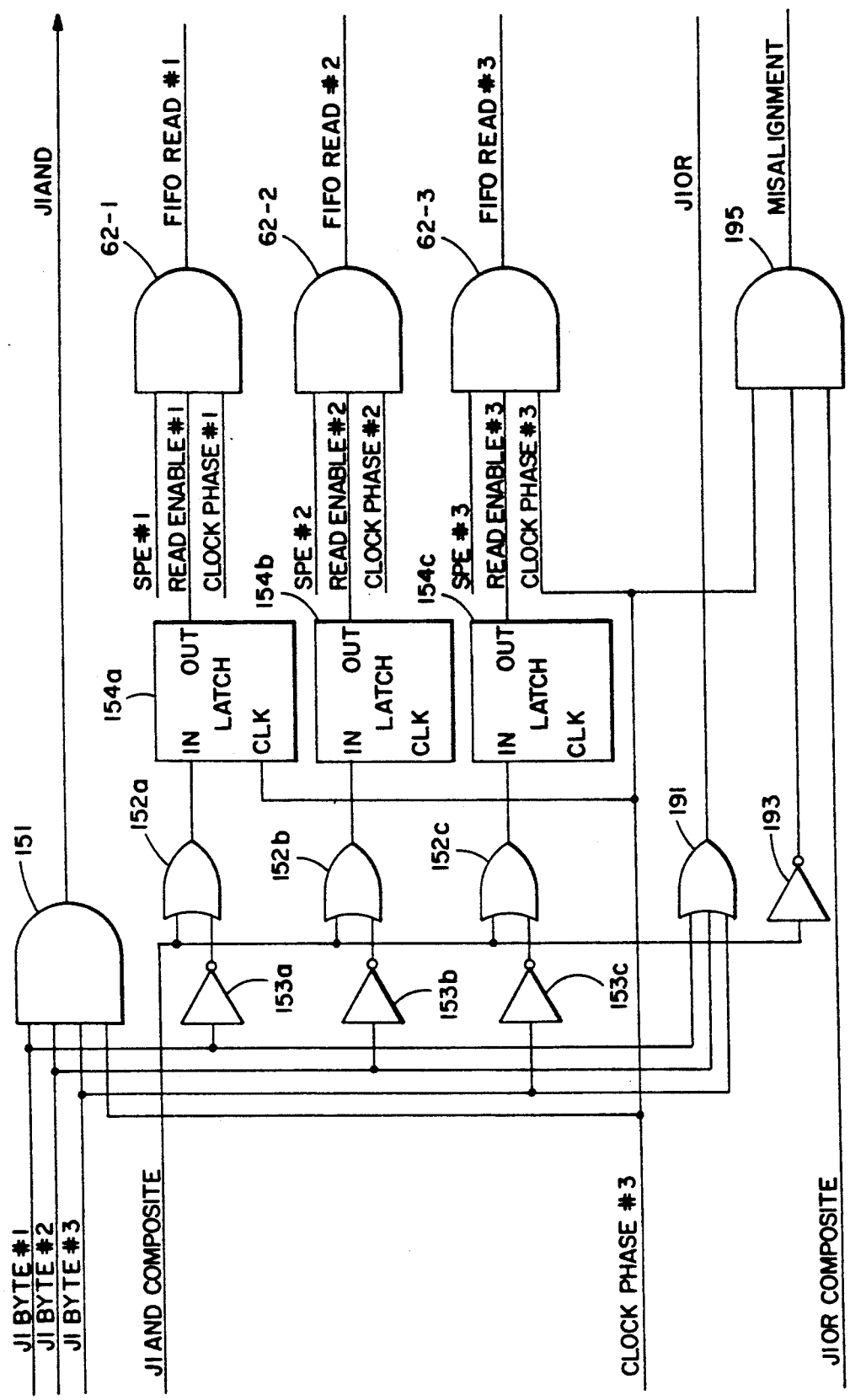
FIG. 5a-1 is a logic diagram of an apparatus for realigning STS-3C signals in a single STS-3 type handling apparatus.
Figures 3, 5A:
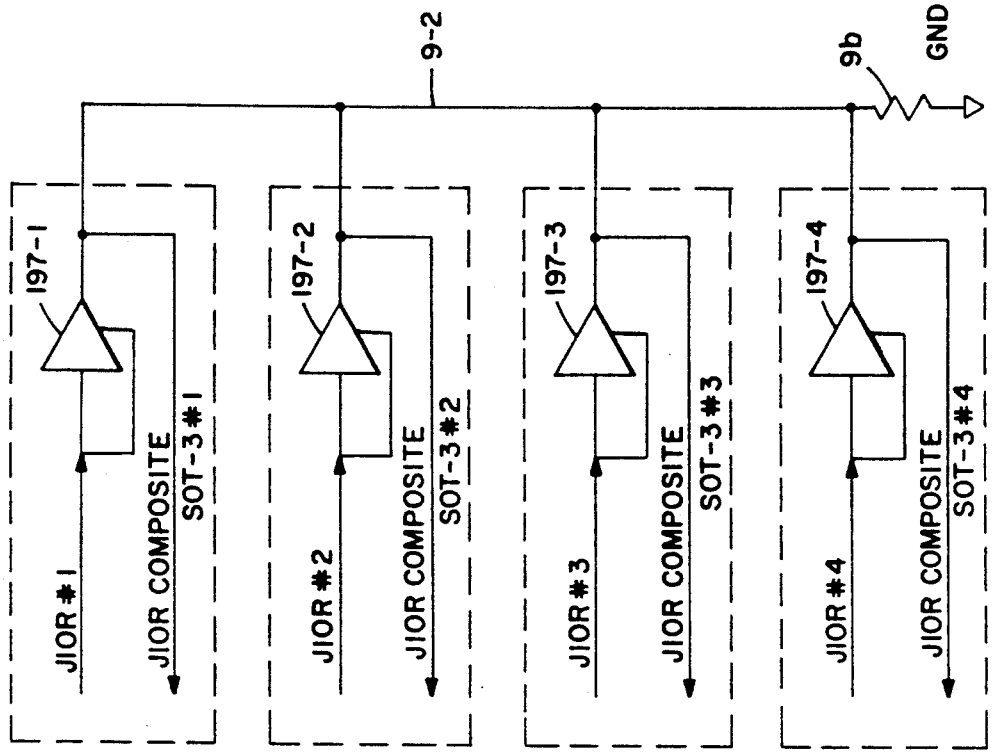
Figures 2, 5A:
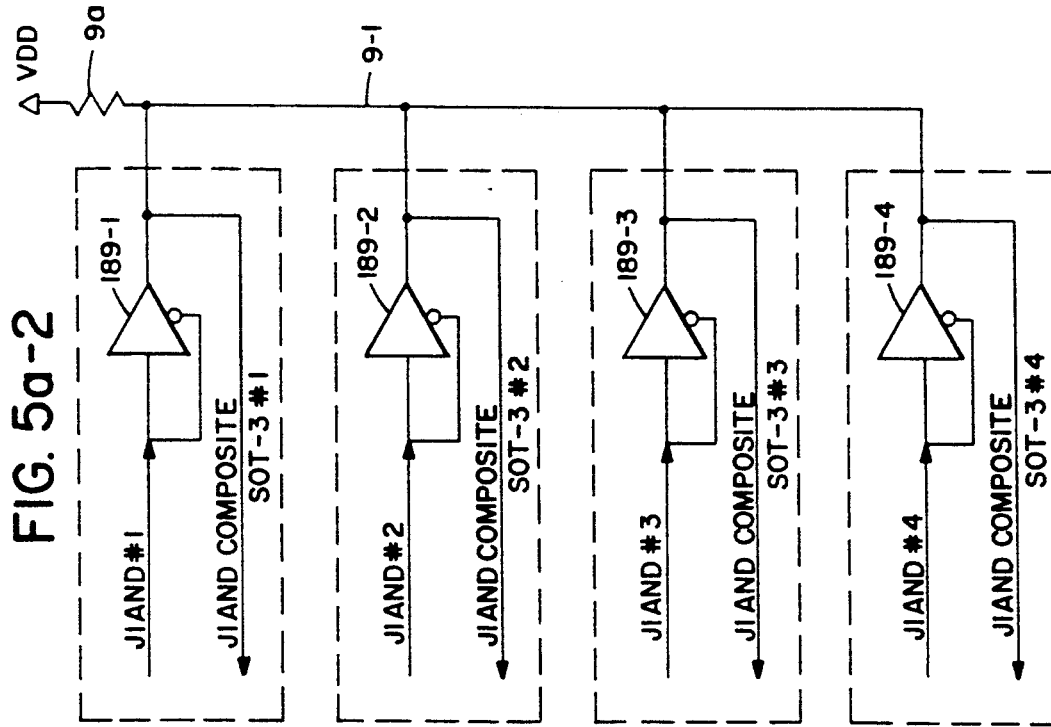
FIG. 2 is a high level block diagram of the preferred retiming apparatus for STS-3 and STS-3C signals.
Figure 6B:
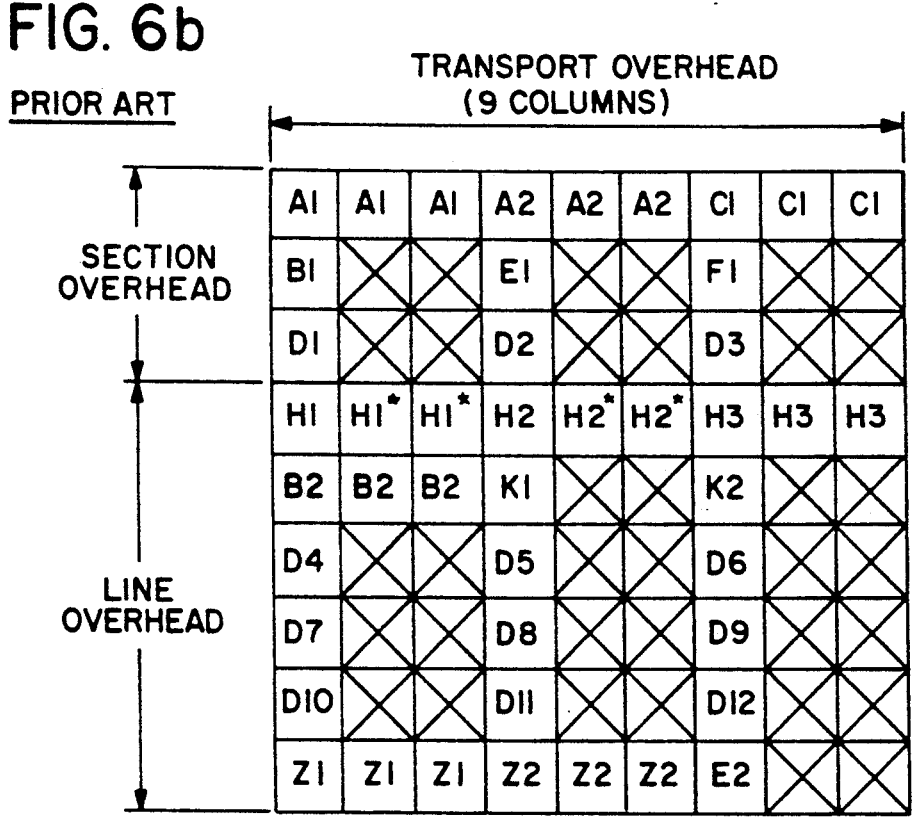

Turning to FIG. 2, details of the retiming and pointer calculation block 18 (and 30) are seen. In particular, the retiming apparatus of the invention includes a demultiplexer 40 for demultiplexing an incoming STS-3 type signal into three STS-1 type signals, three FIFOs 45-1, 45-2, and 45-3 for receiving the STS-1 signals, three depth measurement blocks 48-1, 48-2, and 48-3 for measuring the amount of data in the FIFOs, three frame counters 50-1, 50-2, 50-3 for counting the number of frames of data that have been demultiplexed since a pointer movement, logic decision block 52 for generating pointer movement (increments and decrements) based on the amount of data in each of the FIFOs, a pointer calculation block 54 for generating the pointers in response to information from logic decision block 52, and a multiplexer 55 for multiplexing the SPE data from each of the FIFOs, the pointer information as recalculated by the pointer calculation block 54, as well as other TOH data which may be either "dummy" information (i.e., all zeros), or data obtained from the RAM (of FIG. 1d).

The data input to the demultiplexer 40 is effectively the STS-3 signal. Accompanying the data input are the incoming STS-3 clock, an SPE control signal which indicates when the incoming data is SPE data, a H3 byte indicator control, and a C1J1 byte control signal. The SPE control signal is high only when the data byte being received by the demultiplexer 40 is an SPE byte (i.e., a data byte or a POH byte). The C1J1 byte control signal is high whenever the byte being received by the demultiplexer is a C1 or a J1 byte. For an STS-3 frame, the C1 pulse goes high only for the first C1 byte, and the J1 pulses go high for the J1 byte of each of the three received payloads. The SPE signal is used to distinguish whether the C1J1 high pulse is a C1 pulse or a J1 pulse, as when SPE is high and C1J1 is high, a J1 (POH) byte is being transmitted, and when SPE is low and C1J1 is high, the C1 (TOH) byte is being transmitted. As will be discussed hereinafter, the J1 pulses are necessary for the realignment mechanism of the invention, while the C1 pulse is preferably used for the retiming mechanism of the invention.

Demultiplexer 40 demultiplexes the incoming STS-3 type signal into three parts. Effectively, the incoming STS-3 clock signal is divided into three clocks (clock #1, clock #2, clock #3) by any suitable means such as a revolving mod 3 counter (not shown). The resulting clocks, which are each at one-third the rate of the incoming clock are each ANDed together with the SPE signal by AND gates 58-1, 58-2, 58-3 to generate three write signals (write #1, write #2, write #3). The write signals cause each of the FIFOs 45-1, 45-2, 45-3 to receive the demultiplexed data signals of the SPE only from the demultiplexer 40, with the TOH bytes being effectively demultiplexed out.

The FIFOs 45 of the invention are preferably implemented as register banks. The output of the registers are tristate drivers, and the registers are written to and read from via the use of two walking-one counters. The first walking-one counter (which is effectively a recirculating bucket-brigade having a single one value and all other zeros) is for writing, and acts to latch the incoming data to the selected (addressed) register; i.e., that register which has the one value of the walking-one counter. The second walking-one counter is for reading, and acts to enable the tristate output of the selected register.

The preferred FIFOs of the invention are at least twenty-nine bytes deep and ten bits wide. The particular twenty-nine bit depth of the FIFO is chosen based on the fact that it is desirable to accommodate at least twelve bytes of delay of one STS-1 signal relative to another STS-1 signal without generating an error signal; that it is desirable to absorb at least four successive incoming pointer movements (each four frames apart) without generating an outgoing pointer movement; and that at least six bytes of safety are desired. Each of these aspects will be discussed in more detail hereinafter. The ten bit width of the preferred FIFOs accommodates the eight bits of SPE data bytes, as well as the one bit control signals J1byte and byte03 which accompany the J1 and 03 bytes only (the 03 byte, for purposes herein being defined as the byte which follows the C1 byte). As aforementioned, the J1byte control signal is generated when the SPE is high and the C1J1 control input to demultiplexer 40 is high. The byte03 control signal, on the other hand is generated the first byte the SPE goes high after the SPE control is low and the C1J1 control input to demultiplexer 40 is high. Thus, the 03 byte is used because it is synchronous with the TOH, whereas, if the J1 byte which is synchronous with the SPE were used, a change in the location of the TOH would cause variations in depth measurement. It will be appreciated by those skilled in the art that other bytes synchronous with the TOH could also be used in lieu of the 03 byte.

The depth measurement blocks 48-1, 48-2, 48-3, are preferably counters. The counters use the byte03 control signal exiting the demultiplexer 40 as the start control, and the byte03 control signal exiting the FIFO means as the stop control with each hereinafter described read signal acting to increase the count. The count of the depth measurement block thereby provides an indication of exactly how many bytes were in the associated FIFO when the 03 byte was written to the FIFO. Upon the exiting of byte03 from the FIFO, the count of the depth measurement block is sent to the logic decision block 52. The logic decision block 52, which may be implemented with ad microprocessor, a digital signal processor, or logic circuitry as desired, determines whether a stuff or a destuff is required for each particular outgoing STS-1 component. Where the incoming signal is a STS-3 signal, each STS-1 component can be stuffed or destuffed separately. However, where the incoming signal is a STS-3C signal, as will be described in more detail hereinafter, stuffing or destuffing of the STS-1 "components" must be done together.

The frame counter blocks 50-1, 50-2, 50-3 are also preferably counters. The frame counters use the H3 control signal exiting the demultiplexer 40 to increment the count, and as Will be described in more detail hereinafter, are reset only upon pointer movement which effects a stuff or destuff of the FIFO associated with the frame counter. It should be appreciated that for an STS-3C signal, only one frame counter block is required, as the stuffs or dyestuffs of each STS-1 "component" of the STS-3C signal must occur together. Thus, the frame count since the last pointer movement will always be the same. Regardless of whether one or three frame counter blocks are used, the count(s) from the frame counter block(s) are provided to the logic decision block 52.

The output side of FIFOs 45 utilizes the outgoing (terminal side) clock and frame. In particular, the reference frame effectively determines when the TOH information is required, and hence when the SPE is required and when the POH information (which is part of the SPE) is required. The transport overhead, with the exception of the H1 and H2 bytes, is typically provided as null data (all zeros). The H1 and H2 bytes of the TOH which point to the start of the SPE are generated by the pointer calculation block 54 based on information received by the logic decision block 52 (as is described in more detail hereinafter, and as discussed in the parent application hereto). The only other information required in order to generate the outgoing SPE control signal is whether a stuff or destuff is required. However, that information is supplied by the increment and decrement controls output by the logic decision block 52. Thus, when a destuff is required for one, two, or all of the STS-1 components of the signal, the outgoing SPE control will be kept high for one, two, or all H3 bytes, while when a stuff is required for one, two, or all of the STS-1 components the outgoing SPE control will be kept low for one, two, or all of the three bytes following the H3 bytes.

The read control signals for the FIFOs are generated in much the same fashion as the write control signals. Thus, the terminal side reference clock is effectively demultiplexed into three clocks (outgoing clocks #1, #2, #3), and each outgoing clock is ANDed with its respective outgoing SPE control signal at AND gates 62-1, 62-2, 62-3. Where the outgoing signal is an STS-3C signal, the three different output SPE control signals will always be high and low together. However, where the outgoing signal is an STS-3 signal, since one STS-1 component may require a destuff when the other components do not require a destuff, it is possible for one or two outgoing SPE control signals to be high with the other(s) low. On those occasions, the multiplexer 55 will receive a TOH byte from, e.g., RAM for one or two H3 bytes, while receiving an SPE data signal from one of the FIFOs for the other H3 byte(s). Regardless, multiplexer 55 multiplexes the data signals from FIFOs 45 together with the H1H2 byte information from the pointer calculation means as well as other TOH information (which may be all zeros or may be TOH data from the RAM), into an STS-3 type signal (i.e., STS-3 or STS-3C signal).

Figure 3:
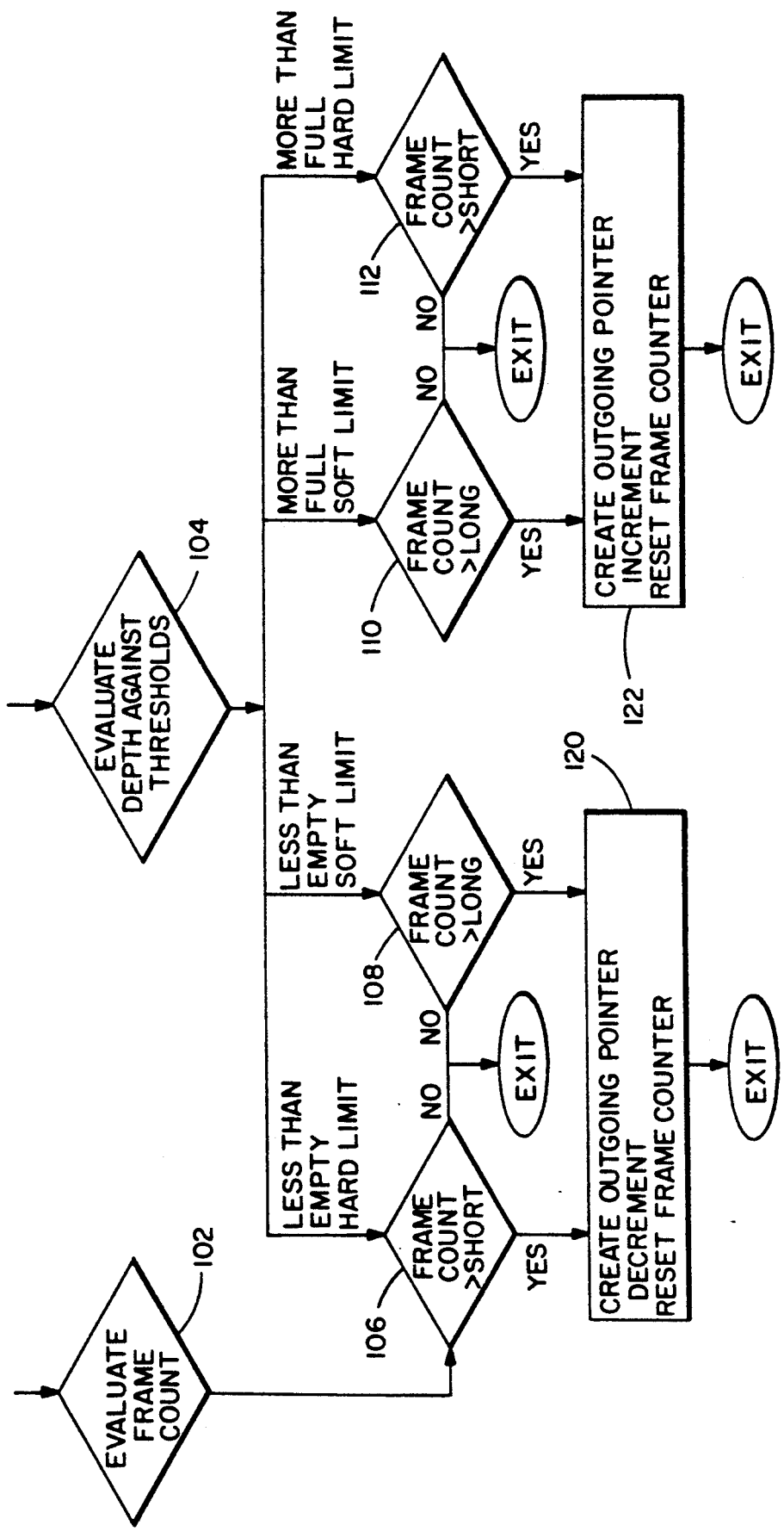
FIG. 3 is a flow chart of the decision mechanism for the retiming apparatus of FIG. 2 for STS-3 signals.

Turning to FIG. 3, a flow chart of the logic decision block 52 for an STS-3 signal is seen. The function of the logic decision block 52 is to determine when a stuff or destuff is needed, as well as to generate a control signal which will cause the stuff or destuff to be effected. Another function of the logic decision block 52 is to generate the stuff and destuff control signals in a manner which limits jitter. As previously described, the inputs to the logic decision block include the frame count(s)and the depth measurements. At step 102, the logic decision block 52 compares each frame count to two different thresholds: a "short" threshold; and a "long" threshold. The "short" threshold is preferably four frames as according to standards, two pointer movements cannot be conducted within four frames of each other. The "long" threshold is preferably thirty-two frames, as the maximum permissable difference between two SONET signals is 40 ppm, which amounts to a pointer movement every approximately thirty-one frames. Thus, if two SONET differences are near the maximum permissable difference, and there are no errors in the signals, the long threshold provides a mechanism which permits pointer movement on a regular basis to accommodate the permissable differences in the signals without having to conduct a more jittery short threshold pointer movement.

At 104, the logic decision block 52 compares each depth measurement count to four different thresholds: an "empty hard limit" ; an "empty soft limit" ; a "full soft limit" , and a "full hard limit". In the preferred embodiment where the FIFO depth is twenty-nine bytes, the empty hard limit is set at seven bytes, the empty soft limit is set at eleven bytes, the full soft limit is set at nineteen bytes, and the empty hard limit is set at twenty-three bytes. Thus, the previously discussed safety margin of six bytes is provided on either end, and the difference between the empty hard limit and the full soft limit (as well as the full hard and empty soft limits) is the preferred twelve bytes.

In accord with the invention, if the particular FIFO depth is less than the empty hard limit (e.g., seven bytes), at 106, a check is made to see whether the frame count is greater than the short frame count, and if so, at 120, an outgoing pointer increment (stuff) control signal is generated, and the frame counter for the particular FIFO is reset. On the other hand, if the frame count is less than the short frame count, a pointer movement is not allowed, and the logic decision block 52 waits another frame for the next depth evaluation for the particular FIFO. Similarly, at 108, if the particular FIFO depth is greater than the empty hard limit (e.g., seven bytes) but less than the empty soft limit (e.g., eleven bytes), a check is made to see whether the frame count is greater than the long frame count (e.g., thirty-two bytes). If yes, at 120, the outgoing pointer increment control signal is generated and the frame counter for the particular FIFO is reset. If not, the pointer movement is not allowed, and the logic decision block waits another frame for the next depth evaluation of the particular FIFO.

At 110 and 112, the logic decision block makes similar comparisons to those of steps 106 and 108, but for the situation where the byte depth is greater than the soft or hard full limits. Thus, at 110, if the byte depth is greater than the full soft limit (e.g., nineteen bytes) but less than the full hard limit (twenty-three bytes), then if the frame count is greater than the long frame count threshold (e.g., thirty-two bytes), at 122 a pointer decrement (destuff—insert data into H3) control signal is generated and the frame counter for the particular FIFO is reset. On the other hand, if the frame count is less than the full soft limit, no pointer movement is allowed, and the logic decision block waits another frame for the next depth evaluation of the particular FIFO. Similarly, if the byte depth is greater than the full hard limit (e.g., twenty-three bytes), at 112 a determination is made as to whether the frame count is greater than the short frame count of four bytes. If yes, then at 122 the pointer decrement control signal is generated and the frame counter for the particular FIFO is reset. If not, no pointer movement is allowed, and the logic decision block waits another frame for the next depth evaluation of the particular FIFO.

In typical functioning, the FIFOs will have fifteen bytes contained therein. Thus, should the outgoing STS-3 type signal be at a slightly faster rate than the incoming STS-3 type signal, reads from the FIFOs will occur slightly more often than writes to the FIFOs. As a result, the FIFOs will be short on data, the empty soft limit will be reached after many frames, and a stuff signal (pointer increment) will be generated. Similarly, should the outgoing STS-3 type signal be at a slightly slower rate than the incoming STS-3 type signal, writes to the FIFOs will occur slightly more often than reads from the FIFOs. As a result, the FIFOs will be long on data (i.e., will fill), the full soft limit will be reached after many frames, and a destuff (pointer decrement) will be generated. By requiring that at least thirty-two data frames have passed since a previous pointer movement in the case of meeting the full soft or empty soft limits, limited jitter is guaranteed. Also, by setting the soft thresholds such that the FIFO must have four additional or four fewer bytes than expected to effect pointer movement, slight relative movements of the data rates (jitter) which might later cancel out are accommodated without the requirement of pointer movement. Further, by causing pointer movement to occur as soon as possible after a the empty or full hard limits, the logic decision block effectively accommodates the exigency of the FIFO running out of data or overflowing. Also, by setting the hard thresholds more than four bytes from the empty or overflow states, continuing operation with stuffing or destuffing is guaranteed even if the difference in incoming and outgoing data rates is as large as one byte per four frames.

As aforementioned, where the incoming and outgoing signals are STS-3C signals, only one frame counter block 50 is required or utilized, and any stuffs and destuffs must be made to all three STS-1 components at the same time. Of course, the same applies to STS-12C signals. The logic of the logic decision block for making stuffs and destuffs for the STS-3C signal case is seen in FIGS. 4a and 4b. As seen in FIGS. 4a and 4b, the decision on whether to stuff or destuff is made as a function of the status (i.e., count <empty hard limit; count <empty soft limit; count >full soft limit; count >full hard limit) of all of the depth measurement blocks as well as the frame count status (i.e., frame count> short; frame count>long). As seen in FIGS. 4a and 4b, where all of the depth measurement indications are the same, the decision to stuff or destuff is made accordingly; provided, or course, that where hard FIFO depth thresholds are exceeded, a stuff or destuff is carried out when the frame count exceeds the short frame count threshold (four frames), and that where soft thresholds are exceeded, the stuff or destuff is carried out when the frame count exceeds the long frame count threshold Also, as seen in FIGS. 4a and 4b, where any of the FIFOs exceed a hard FIFO depth threshold, a stuff or destuff is carried out (for all STS-1 components) if the frame count exceeds the short frame count threshold regardless of the position of the other FIFOs, as long as the other FIFOs either exceed a soft or hard threshold in the same direction, or are in the normal range. However, where one of the FIFOs exceeds the soft or hard threshold in a direction opposite to the FIFO exceeding the hard FIFO depth threshold, an error signal is generated (see FIG. 4b) to indicate that the incoming STS-1 offset is greater than permitted.

With regard to the soft FIFO depth thresholds, a stuff or destuff is only made where all three FIFOs have the same indication. Thus, if two FIFOs show that a soft threshold is exceeded, but one FIFO shows that the soft threshold is not exceeded, no action is taken. Likewise, where two different FIFOs show that soft thresholds in different directions are exceeded, no action is taken. Of course, it will be appreciated that similar logic decisions can be made with regard to an STS-12C signal which is comprised of twelve STS-1 or four STS-3 components.

With the STS-3C (and STS-12C) signals, as aforementioned, stuffs and destuffs must be made to all of the STS-1 components at the same time. This is because the structure of the STS-3C signal is more rigid than the structure of the STS-3 signal in that each byte of each STS-1 component is aligned with the other bytes of the other STS-1 components. Thus, all of the SPEs will start at the same location, all of the path overhead bytes (e.g., J1) will be located together, etc. However, only one H1H2 SPE pointer is provided in the STS-3C (or STS-12C) signal, with the other H1 and H2 byte locations being provided with predefined values to indicate an STS-3C (or STS-12C) signal.

Because the bytes of the STS-NC signal must be properly aligned, different delays through the FIFOs 45 or through a cross-connect can cause an error in the outgoing STS-NC signal if not properly accounted for. This problem is particularly acute on start-up, although it can occur during regular operation. In accord with another aspect of the invention, (re)alignment is obtained by requiring that all J1 bytes be available for reading in order and at the same time. This requirement is met in each terminating apparatus 10 by taking the logical AND of the J1 control outputs of the three FIFOs together with the third clock (clock #3). Then, the logical AND output is ANDed with the logical AND output of the other concatenated terminating apparatus 10 to provide a J1ANDcomposite signal as described below. If, in each terminating apparatus, the logical AND of the four inputs together is a one, and the logical AND of that result for the concatenated apparatus is also a one, then a byte (i.e., the J1 byte) may be read from each FIFO (i.e., the read signal for each FIFO will go high) of each of the apparatus. Of course, where the J1 byte control signal is not exiting any particular FIFO, then as long as the SPE and clock associated with that particular FIFO are high (as described above), a read signal will be generated for that FIFO. Effectively, then, and as seen in FIG. 5a, a read enable signal ReadEn is used as a third input into AND gates 62 in order to permit read signals to be generated, and the read enable signals are generated according to the logical equations:

$$ReadEn1 = \{[J1[1] AND\ J1[2] AND \ldots AND\ J1[n]\ AND\ Clock\ \#3]\ OR\ [NOT\ J1[1]]\}\ LATCHED\ WITH\ \{CLOCK\ 3\}$$

$$ReadEn2 = \{[J1[2]\ AND\ J1[2]\ AND \ldots AND\ J1[n]\ AND\ Clock\ \#3]\ OR\ [NOT\ J1[2]]\}\ LATCHED\ WITH\ \{CLOCK\ 3\}$$

$$ReadEn3 = \{[J1[1]\ AND\ J1[2]\ AND \ldots AND\ J1[n]\ AND\ Clock\ \#3]\ OR\ [NOT\ J1[3]]\}\ LATCHED\ WITH\ \{CLOCK\ 3\}$$

For each STS-3 type terminating apparatus, implementation of the generating of the read enable signals requires a four input AND gate 151, three OR gates 152a, 152b, 152c, three inverters 153a, 153b, 153c, and three latches 154a, 154b, 154c, as seen in FIG. 5a-1. As seen in FIG. 5a-2, the J1AND outputs of the four input AND gates 151 of each STS-3 type terminating apparatus are coupled via tristate drivers 189 (189-1, 189-2, 189-3, 189-4) to bus 9-1 which terminates with a pull-up resistor 9a which couples the bus 9-1 to a high voltage rail $V_{DD}$. With the arrangement as shown in FIG. 5a-2, whenever a J1AND signal from a terminating apparatus is low, and output of the corresponding tristate driver 189 will go low and will pull the voltage on line 9-1 low. Thus, the J1ANDcomposite signal which is taken from the state of the bus 9-1, will go low if any of the J1AND signals is low. On the other hand, if all of the J1AND signals are high, the outputs of the tristate driver 189 will float, and with bus 9-1 terminating with pull-up resistor 9a, the voltage on the bus will be pulled high. With the voltage on bus 9-1 high, the J1ANDcomposite signal goes high, and with the J1ANDcomposite signal high, the read enable signals can be generated.

In addition to the read enable signals which are generated, a misalignment control signal is preferably generated when misalignment occurs. Misalignment (align error) can be defined logically as the state when for any particular J1, the logical AND of that J1 with clock #3 and with the opposite of the logical AND of each of the J1 signals is one. Logically:

$$Misalignment = [J1OR]\ AND\ [J1AND]\ AND\ [CLOCK\ 3]$$

where J1OR = [J1[1]] OR [J1[2]] OR ... OR [J1[n]] and where J1AND=[J1[1]] AND [J1[2]] AND ... AND [J1[n]].

In other words, whenever one of the J1 values is high, if the all of the J1 values are not high together at clock 3, there is a misalignment. For an STS-3 type signal, n equals three, while for an STS-12 type signal, n equals twelve. The misalignment signal is generated as seen in FIGS. 5a-1 and 5a-2 with the use of a three input OR gate 191, an inverter 193, a three input AND gate 195, and tristate drivers 197 (197-1, 197-2, 197-3, 197-4). Thus, three input OR gate 191 generates a J1OR signal for each terminating component 10. The J1OR signal is fed through tristate drivers 197 to bus 9-2 which terminates in pull down resistor 9b which couples the bus 9-2 to a low voltage rail (Ground). When any of the J1OR signals are high, the output of the associated tristate driver 197 pulls bus 9-2 high, and the J1ORcomposite signal which is taken from the state of the bus 9-2 also goes high. The J1ORcomposite signal, the inverted J1ANDcomposite signal, and clock phase #3 are input into AND gate 195 to provide the misalignment signal as set forth logically above.

Figure 5B:
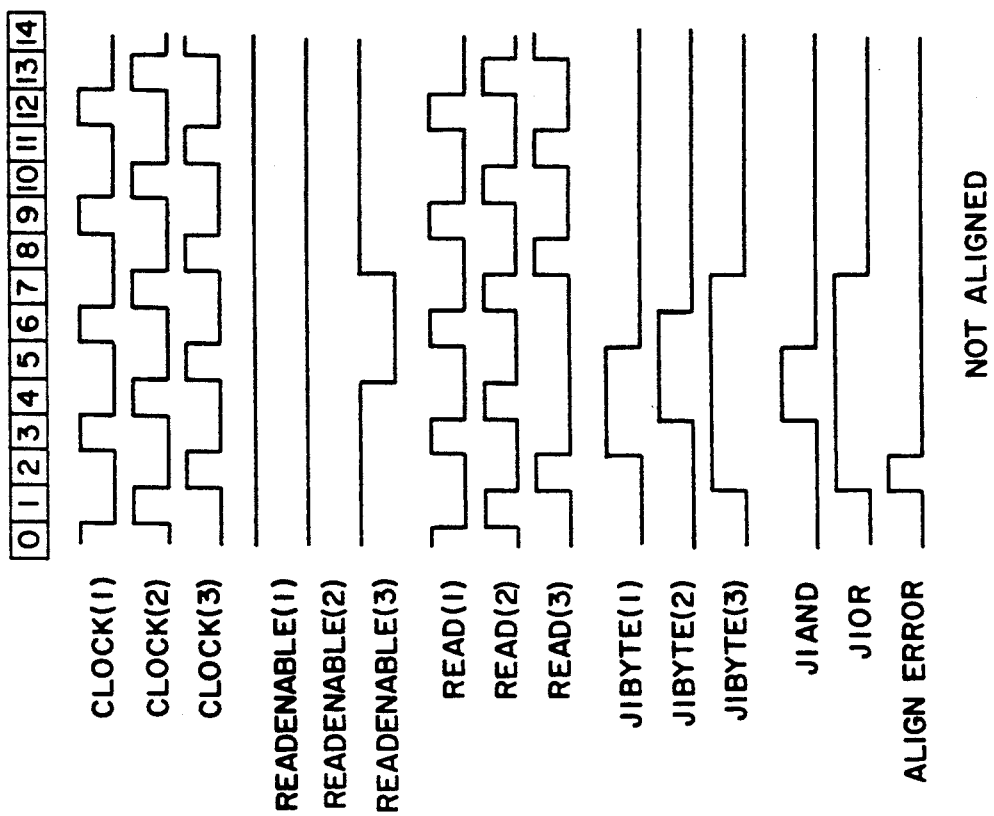
FIGS. 5b and 5c are timing diagrams for an aligned STS-3C signal and for a misaligned STS-3C signal.
Figure 5C:
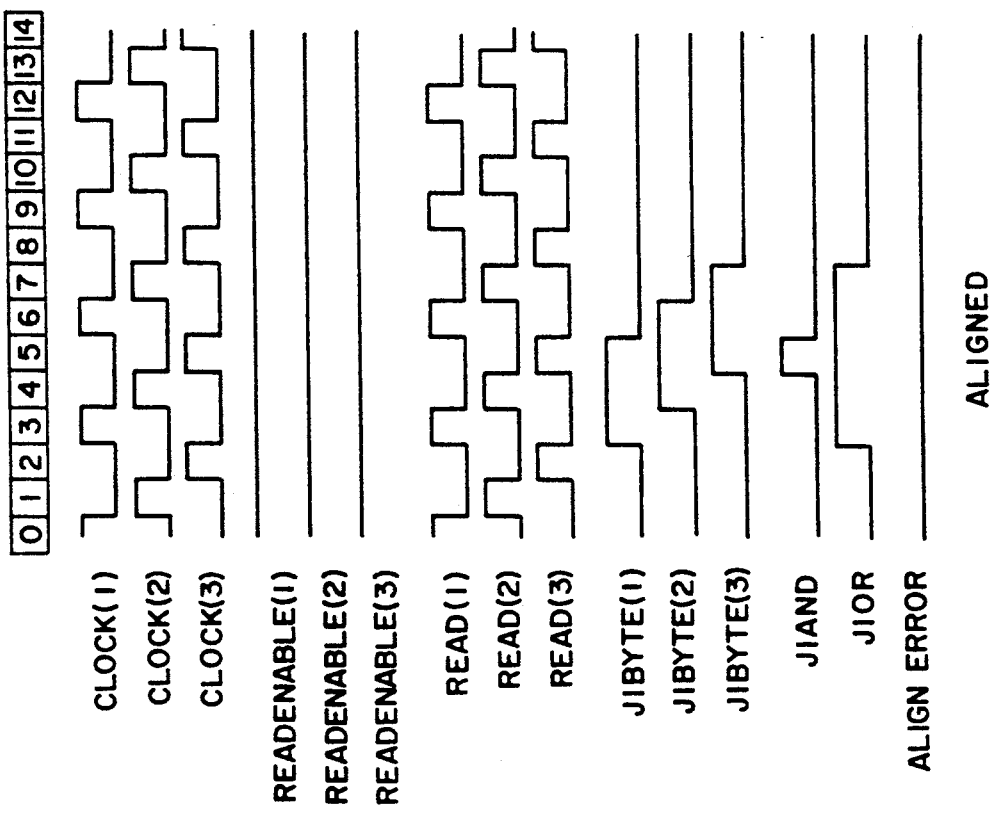

The timing diagrams of FIGS. 5b and 5c further explain the mechanism for realigning misaligned signals vis-a-vis STS-3 type signals. The realignment of misaligned STS-12c type signals is a clear extension therefrom as will be recognized by those skilled in the art. As seen in FIG. 5b, clock #1, clock #2, and clock #3 are staggered, but together represent the outgoing STS-3C clock rate. The read[l], read[2], and read[3]signals are being generated in parallel with the clock #1, clock #2, and clock #3 pulses and hence are also staggered. Similarly, the J1 bytes J1[1], J1[2], J1[3] are staggered, although each is held for three STS-3C clock cycles, such that at a clock #3, all of the J1 bytes are high. Thus, a J1AND signal is generated at clock pulse 5 of FIG. 5b, which pulse occurs concurrent with clock #3. Thus, based on the description above, everything is properly aligned. A J1OR signal is also shown in FIG. 5b.

Turning to FIG. 5c, a misaligned signal is seen with J1[3] occurring before J1[1] and J1[2]. Thus, at pulse 2 J1[3] is high without J1[1]and J1[2]being high, and a misalignment pulse (align error) occurs. As a result of the misalignment, the read enable signal ReadEn3 as seen for clock counts 5-7 does not stay high, and hence the data read from FIFO 45-3 at that time is the previous data and not the J1[3] data byte. As seen in FIG. 5c, at pulses 3 and 4, the J1[1] and J1[2] signals go high. As a result, because J1[3] is still high, J1AND goes high for two clock pulses (4 and 5). Because clock pulse 5 corresponds to clock #3, all three FIFOs are read enabled, and the J1 bytes are read consecutively out of the FIFOs as shown. Thus, the STS-3C signal is now realigned.

In accord with the preferred embodiment of the invention, when any data byte must be reread from a FIFO, an error is flagged by setting a misalignment error bit at the microprocessor interface. The error bit is effectively set according to the logic that when J1OR is high, but J1OR AND J1AND is low, the error bit is set. Also, according to the preferred embodiment of the invention, if the error bit is set and an error reset bit is set by the microprocessor (which is typically done on start-up only), data is sent until the beginning of an SPE subframe. Then, the pointers on the register banks of the FIFOs are realigned such that the read pointer is half a FIFO away from the write pointer; i.e , the FIFO is reset to a depth of fifteen bytes.

It will be appreciated by those skilled in the art that the realignment techniques disclosed herein may also be applied to realignment of STS-1 components of an STS-3C signal where the STS-1 components have been separately sent through a switched network (and equally for the realignment of STS-1 or STS-3C components of an STS-Nc signal where they have been separately sent through a switched network). In such a situation, it is desirable to provide a large RAM space typically divided into three (or 3n) sections in lieu of the three (or 3n) FIFOs, as the delays through the switched network can be considerably different (even hundreds of frames worth) for each STS-1 component, and extremely large FIFOs would be very expensive. In such a situation, it is also necessary to provide a synchronization mechanism beyond the J1 byte realignment mechanism, as it is necessary to realign the frames of one STS-1 component with the corresponding frames of the other STS-1 components. In other words, just aligning the J1 bytes does not guarantee proper realignment, as the J1 byte of one component may be the J1 byte of a different frame when delays are large. Thus, in accord with the invention, the H4 or an undefined POH byte can be used as a synchronization signal. For example, one H4 byte in two hundred fifty-six ($2^8$) can be coded with all ones, and the other H4 bytes coded as all zeros or as desired, or the H4 bytes can be coded in a numerical order (one to two hundred fifty-six), and at the realignment circuitry, the H4 byte or other designated POH byte can be monitored such that only when the three H4 bytes have all ones (or the same coded number) and then the J1 byte realignment mechanism is satisfied can the reading from the RAM start. In this manner, not only will the J1 bytes and hence the SPEs be aligned, but the SPEs of one STS-1 component will be aligned with the SPEs of corresponding STS-1 components of the STS-3 (or SDS-Nc) signal.

There have been described and illustrated herein apparatus for the concatenation of STS-N type signals. It will be appreciated that the methods of the invention relate directly to the apparatus. While the invention has been described with particular application to using STS-3 components of an STS-12 type signal, and while particular embodiments of the invention have been described, it is not intended that the invention be limited thereto, as it is intended that the invention be as broad in scope as the art will allow and that the specification be read likewise. Thus, while particular logic circuitry has been disclosed for accomplishing realignment, it will be appreciated that other logic circuitry could be utilized. Also, while a particular TOH synchronous byte (03) was described as being used for permitting tracking of FIFO depth, and while a particular POH byte (J1) was described as being used for accomplishing realignment, it will be appreciated that different bytes could be utilized provided that the byte used for tracking FIFO depth is synchronous with the TOH, while the byte used for establishing realignment of the STS-3C signal is synchronous with the POH. Likewise, a different byte could be used for tracking the number of frames since a last pointer movement was accomplished. Those skilled in the art will further appreciate that while the invention was described with FIFOs of a preferred depth, and hard and soft thresholds of a certain number of bytes, it will be appreciated that FIFOs of a different depth can be utilized, and that the thresholds can be changed, provided, of course, that both hard and soft thresholds are utilized in the retiming mechanism. Similarly, it will be appreciated that more than two FIFO depth thresholds and timing tresholds can be utilized. It will therefore be appreciated by those skilled in the art that yet other modifications could be made to the provided invention without deviating from its spirit and scope as so claimed.

We claim:

1. An apparatus for concatenating a plurality of STS-m type signals having SPEs into an STS-n type signal having POH bytes, where m is at least 1, and n is at least three, and n is a multiple of m, comprising:
   (a) at least three substantially identical STS-m type signal terminating apparatus, wherein one of said plurality of substantially identical STS-m signal terminating apparatus is a master apparatus, and the others of said terminating apparatus are slave apparatus;
   (b) in each of said STS-m type signal terminating apparatus,
      (1) memory means for storing respective STS-m type signals,
      (2) writing means and reading means coupled to said memory means for writing said STS-m type signals into said memory means and for reading said STS-m type signals from said memory means,
      (3) means for generating a first control signal related to a predetermined byte which is synchronous with the POH bytes,
      (4) means for calculating a B3 parity value for the SPE of the STS-m type signal in conjunction with the B3 parity value of an adjacent STS-m type signal terminating apparatus, if any,
   (c) control signal generating means in said master apparatus for generating a transmit SPE control signal when said STS-n SPE is to be transmitted;
   (d) means for making a logical AND from said first control signals of said STS-m type signal terminating apparatus and generating therefrom a composite control signal,
   wherein said reading means of each of said STS-m type signal comprises logic means for receiving said composite control signal and said STS-n SPE control signal such that reading from said memory means is under control of said logic means.

2. An apparatus according to claim 1, wherein: each said memory means is a FIFO.

3. An apparatus according to claim 1, wherein: said STS-m signal is an STS-3 type signal, and said STS-n signal is an STS-12C type signal, said at least three substantially identical STS-m type signal terminating apparatus comprise four substantially identical STS-3 type signal terminating apparatus,
each memory means of each said STS-3 type signal terminating apparatus includes at least three distinct areas, each for an STS-1 component of its STS-3 type signal, and
each means for generating a first control signal related to a predetermined byte which is synchronous with the POH bytes comprises means for generating three control signals related to the predetermined byte in each STS-1 component, wherein said means for making a logical AND from said first control signals of said STS-m type signal, makes a logical AND of said twelve control signals and generates therefrom said composite control signal.

4. An apparatus according to claim 3, wherein: said predetermined byte is a J1 byte.

5. An apparatus according to claim 3, wherein: said means for making a logical AND from said control signals comprises a bus coupled to each of said STS-3 type signal terminating apparatus.

6. An apparatus according to claim 5, wherein: said predetermined byte is a J1 byte, and each said memory means comprises three FIFO means.

7. An apparatus according to claim 3, wherein: said four substantially identical STS-3 type signal terminating apparatus include said master, a first slave, a second slave, and a third slave,
said means of said third slave for calculating a B3 parity value calculates a first B3 parity value for the three STS-1 components of its STS-3 type signal at a first predetermined time between said J1 byte and said B3 byte of said STS-12C signal,
said means of said second slave for calculating a B3 parity value calculates a second B3 parity value for the six STS-1 components of its STS-3 type signal and the STS-3 type signal of said third slave at a second predetermined time after said first predetermined time and before said B3 byte of said STS-12C signal
said means of said first slave for calculating a B3 parity value calculates a third B3 parity value for the nine STS-1 components of its STS-3 type signal and the STS-3 type signals of said second and third slaves at a third predetermined time after second predetermined time and before said B3 byte of said STS-12C signal, and
said means of said master for calculating a B3 parity value calculates a final B3 parity value for the twelve STS-1 components of its STS-3 type signal and the STS-3 type signals of said first, second and third slaves at a fourth predetermined time after said third predetermined time and before said B3 byte of said STS-12C signal.

8. An apparatus according to claim 3, wherein: said four substantially identical STS-3 type signal terminating apparatus include said master, a first slave, a second slave, and a third slave,
said means of said third slave for calculating a B3 parity value calculates a first B3 parity value for the three STS-1 components of its STS-3 type signal at a time between said J1 byte and said B3 byte of said STS-12C signal and said third slave includes means for sending a B3 control signal and then said first B3 parity value to said second slave,
said means of said second slave for calculating a B3 parity value calculates a second B3 parity value for the six STS-i components of its STS-3 type signal and the STS-3 type signal of said third slave at a time after said first time and before said B3 byte of said STS-12C signal and said second slave includes means for sending said B3 control signal and then said second B3 parity value to siad first slave,
said means of said first slave for calculating a B3 parity value calculates a third B3 parity value for the nine STS-1 components of its STS-3 type signal and the STS-3 type signals of said second and third slaves at a third time after said second time and before said B3 byte of said STS-12C signal, and said first slave includes means for sending said B3 control signal and then said third B3 parity value to said master, and said means of said master for calculating a B3 parity value calculates a final B3 parity value for the twelve STS-1 components of its STS-3 type signal and the STS-3 type signals of said first second and third slaves at a fourth time after said third time and before said B3 byte of said STS-12C signal.

9. A method for concatenating a plurality of STS-m type signals having SPEs into an STS-n type signal having POH bytes, where m is at least 1, and n is at least three, and n is a multiple of m, comprising:

(a) receiving said plurality of STS-m type signals in at least three substantially identical STS-m type signal terminating apparatus, wherein one of said plurality of substantially identical STS-m signal terminating apparatus is a master apparatus, and the others of said terminating apparatus are slave apparatus;

(b) in each of said STS-m type signal terminating apparatus, (1) writing each said respective STS-m type signal into a memory means of said respective terminating apparatus, (2) generating a first control signal related to a predetermined byte which is synchronous with the POH bytes, (3) calculating a B3 parity value for the SPE of the STS-m type signal in conjunction with the B3 parity value of an adjacent STS-m type signal terminating apparatus, if any, (c) in said master apparatus, generating a transmit SPE control signal when said STS-n SPE is to be transmitted;

(d) generating a composite control signal by taking a logical AND of said generated first control signals, and (e) under control of said composite control signal and said transmit SPE control signal, reading from each said memory means to generate said STS-n type signal.

* * * * *